United States Patent [19]

Gautreaux et al.

[11] Patent Number: 4,784,840
[45] Date of Patent: Nov. 15, 1988

[54] POLYSILICON FLUID BED PROCESS AND PRODUCT

[75] Inventors: Marcelian F. Gautreaux; Robert H. Allen, both of Baton Rouge, La.

[73] Assignee: Ethyl Corporation, Richmond, Va.

[21] Appl. No.: 114,453

[22] Filed: Oct. 28, 1987

Related U.S. Application Data

[63] Continuation of Ser. No. 899,906, Aug. 25, 1986, abandoned.

[51] Int. Cl.$^4$ .......................... C01B 33/02; B05D 7/00
[52] U.S. Cl. ...................................... 423/349; 423/348; 427/213
[58] Field of Search ....................... 423/348, 349, 350; 427/86, 213, 716

[56] References Cited

U.S. PATENT DOCUMENTS

| | | | |
|---|---|---|---|
| 4,154,870 | 5/1979 | Wakefield | 427/8 |
| 4,207,360 | 6/1980 | Padovani | 427/213 |
| 4,292,344 | 9/1981 | McHale | 427/45.1 |
| 4,314,525 | 2/1982 | Hsu et al. | 118/716 |
| 4,444,811 | 4/1984 | Hsu et al. | 427/213 |

OTHER PUBLICATIONS

Hsu et al, *Fluidized Bed Silicon Deposition,* 18th IEEE Photovoltaic Specialists Conference (1984), pp. 553–557.
Hsu et al, *Fines in Fluidized Bed Silane Pyrolysis,* J. Electrochem. Soc., vol. 131, No. 3, pp. 660–663 (Mar. 1984).
Eversteijn, *Gas-Phase Decomposition of Silane in a Horizontal Epitaxial Reactor,* Philips Res. Reports 26, 134–144 (1971).

*Primary Examiner*—John Doll
*Assistant Examiner*—Lori S. Freeman

*Attorney, Agent, or Firm*—John F. Sieberth; Robert A. Linn

[57] ABSTRACT

Silicon of high purity is used in making semiconductor devices. Silicon for this purpose is made by decomposing silane in a fluidized bed reactor. This process entails thermal decomposition of silane to deposit additional metallic silicon on particles of high purity silicon. To obtain good process economics, two modes of operation are used. In a first mode, the reactor is operated under high productivity conditions which also result in co-production of silicon dust or fines. Some of the dust is deposited on the product silicon particles and some of it is elutriated by gas flow in the reactor and removed through an exit point near the top of the reactor apparatus. The dust on the particles can cause problems in handling. For example, in bagging the particles, or removing the particles from a bag, the dust can become airborne from the larger particle surfaces and form an objectionable cloud of silicon dust. The invention provides a method for uniting dust to the larger silicon particles, and also provides the improved silicon particles produced by the process. The improvement comprises a second mode, viz depositing a thin (0.1–5.0 micron) layer of high purity silicon on the dust laden particles. This second mode is most preferably carried out by (a) treating the dust-laden particles with a deposition gas comprising 1 to 5 mole % silicon admixed with an inert carrier gas such as hydrogen, (b) in a fluidized bed reactor, and (c) at a process temperature of 620°–650° C. By this method the amount of readily removable dust can be considerably reduced, forming an improved product tht is better suited for commerce. The process can be extended to the use of other silicon-containing gases such as dichlorosilane and trichlorosilane by selecting reaction conditions suitable for use with those substances.

20 Claims, 1 Drawing Sheet

POLYSILICON FLUID BED PROCESS AND PRODUCT

This application is a continuation of application Ser. No. 899,906, filed Aug. 25, 1986, now abandoned.

BACKGROUND OF THE INVENTION

1. Field of the Invention

This invention pertains to silicon deposition by silane pyrolysis in a fluidized bed reactor. More particularly, it pertains to an improved method for preparing high purity silicon. In an important aspect, this invention provides means for reducing the amount of silicon dust on the surface of larger silicon particles.

2. Description of the Prior Art

It is known in the art that the fluidized bed reactor offers many advantages for chemical vapor depositions. For example, the fluidized bed provides improved energy utilization and material economy; confer Wakefield, U.S. Pat. No. 4,154,870. As pointed out in that reference, continuity of operation, the large surface area of the fluidized particles, and the high exposure of solid surfaces to the gas stream, all provide economy of operation.

McHale, U.S. Pat. No. 4,292,344, pertains to production of polycrystalline silicon by decomposition of silane, or a halosilane, in a fluidized bed. It teaches that process conditions are preferably maintained so that decomposition of the silicon compound occurs in a heterogeneous manner; i.e. so that silicon is deposited on the surface of particles in the bed. However the reference points out that in conventional reactors, homogeneous decomposition of silane also takes place, resulting in the formation of fine silicon powder or dust. This material is a light, fluffy powder and is usually undesirable since it is difficult to handle.

Eversteijn, *Philips Res. Repts.* 26, 134–144, (1971) comprises a study of gas phase decomposition of silane in a horizontal epitaxial reactor. It was found that gas phase decomposition is a serious factor that must be taken into account. In order to avoid gas phase decomposition, the maximum silane concentration in the hydrogen admitted to the reactor was 0.12–0.14 volume percent, depending on the gas temperature. When this critical silane concentration was exceeded, gas phase decomposition occurred giving rise to silicon fines which deposited on the substrate.

The Eversteijn article is referenced in Hsu et al, *J. Electrochem Soc.: Solid State Science and Technology*, Vol. 131, No. 3, pp. 660–663, (March, 1984). As stated there, the success of the Siemen's process led to its universal adoption for producing semiconductor grade silicon, and the de-emphasis of fluidized bed (FB) process development. In 1975, the potential market for semiconductor grade silicon for photovoltaic use made fluidized bed (FB) production of polysilicon more attractive. Fluidized bed operation has the capabilities of high-throughput, continuous operation and low energy cost. Because silane has a low deposition temperature, and can be completely converted in a non-reversible reaction, it is attractive for use in FB operation. Additional advantages are the non-corrosive atmosphere, and ease of recycling by-product hydrogen. In conventional chemical vapor decomposition devices, there is a limit of silane concentration in hydrogen beyond which unwanted fines are homogeneously nucleated. Thus, in addition to the desired deposition, silicon dust or fines appear in the gas phase. These particles vary in size from submicron to ~10 microns, and present mechanical problems in the operation of the reactor. They are also difficult to transport. Dust and fines are considered losses in the process. Hence, conventional reactors are operated with low silane concentrations to prevent excess fines formation. In a fluidized bed reactor, less fines are generated because (i) there is less free space available for homogeneous nucleation and (ii) the silicon particles scavenge the fines and incorporate them into the deposition growth. Consequently, the net amount of fines is less than for chemical vapor deposition apparatus, and a fluidized bed reactor can be operated at much higher silane concentrations with greater throughput. Variables which effect the amount of fines elutriated were studied. Conclusions reached were as follows:

Elutriated fines increase with increased silane concentration, increased temperature, increased gas bubble size, and increased gas velocity. The authors selected 600°–800° C. and a gas velocity of $U/U_{MF}=3-8$ as good operating parameters.

Another article, Hsu et al, *Eighteenth IEEE Photovoltaic Specialists Conference* (1984) pp. 553–557, discusses additional studies on fines formation. It states that silane pyrolysis in a fluidized bed reactor can be described by a six-path process: heterogeneous deposition, homogeneous decomposition, coalescence, coagulation, scavenging, and heterogeneous growth of fines. The article indicates that fines formation can be reduced by providing at a suitable bed location, a secondary source of silane for cementation.

The cited art clearly shows that production of silicon via decomposition of silane is complicated, and that provision of improved processes is not straight forward. Nonetheless, because of continuing advances in the electronics industry and the development of new products in that field, improvements in existing technology are needed to provide high purity silicon at reduced cost. This invention, which enhances operation of fluidized bed methods by providing means to make high quality product under high productivity operating conditions, satisfies that need.

SUMMARY OF THE INVENTION

This invention provides a process which causes silicon dust on the surface of larger silicon particles to adhere to, and become an integral part of the larger particles. By this process, the amount of dust that is readily removable from product silicon particles is reduced, and consequently a more acceptable product is formed. Furthermore, with the method of this invention, it is economically feasible to operate a fluidized bed reactor for at least much of the time, under conditions which allow high production rates. Since high overall productivity can be achieved, initial reactor investment can be reduced; primarily because the reactor can be smaller than what would otherwise be required.

It has been found that the silicon products of this invention, which comprise dust and larger particles bonded together, are suitable for the production of silicon for semiconductor devices. Thus they comprise a useful article of commerce.

This invention provides:

1. improved product,
2. means for improving product quality, and 3. means which enable high productivity rates to be employed.

In another aspect, this invention provides means for upgrading a product, not by removal of unwanted material from product surfaces, but by making this unwanted material an integral part of the product. Thus dust or fines are not wasted. Moreover, with this invention it is not necessary to resort to expensive techniques such as polishing or washing, to remove the dust or fines.

DESCRIPTION OF PREFERRED EMBODIMENTS

Figure 1:
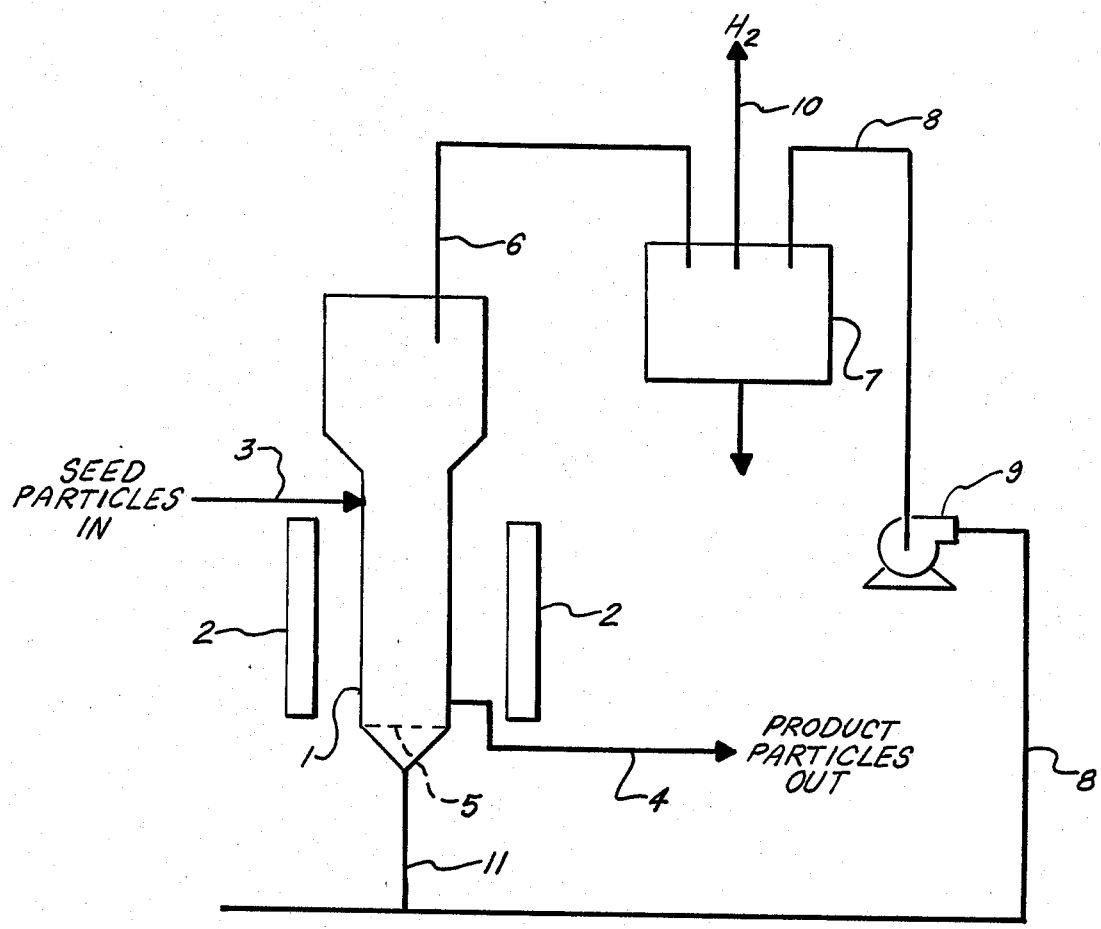
FIG. 1, is a schematic representation, partly in cross section and not to scale, of a fluid bed reactor and attendant equipment in accordance with certain embodiments of this invention. This figure pertains to a semi-continuous process or method of this invention.

In a major aspect, this invention provides a process for reducing the amount of silicon dust or fines on the surface of larger silicon particles. The process comprises contacting silicon that has surface silicon dust thereon with a gas containing a thermally decomposable silicon-containing compound, while decomposing the compound under conditions that both favor chemical vapor decomposition and retard homogeneous deposition, thereby forming a thin layer of silicon deposit that "glues" or binds the dust to the surface of the treated silicon surface. The gluing on process of this invention is well suited to treatment of silicon particles made by a fluidized bed operation which comprises decomposition of silane, dichlorosilane, trichlorosilane or similar silane-containing compound. The step of "gluing on", i.e. binding the dust or fines with the thin layer of silicon, can be conducted with a silicon-containing gas which is the same or different from the silicon substance used in the particle growth phase or mode. Although the process of this invention has wide applicability and can be modified as apparent to one skilled in the art, it is admirably suited to a fluidized bed operation which uses silane in hydrogen as a deposition gas. Most preferably, the process is conducted using two modes; the first being a high productivity growth phase; and the second being the gluing on step in which dust that was formed and deposited on the particles in the first phase is made to adhere to the larger particles that were produced in the first phase.

A preferred embodiment of this invention is:

A process for reducing the amount of removable silicon dust accumulated on the surface of particles of high purity silicon,
said process comprising depositing on the surface layer of dusty silicon particles a thin layer of high purity silicon having an average thickness of from about 0.1 to about 5 microns to cement silicon dust to the surface of said high purity silicon particles, said layer being produced by the thermal decomposition of silane gas, said process being conducted:

(A) by fluidizing a bed of high purity silicon particles having removable silicon dust on surfaces thereof with a stream of deposition gas having a motive force sufficient to maintain said bed in a fluidized state, such that such silicon particles are intimately contacted with sufficient silane contained within said deposition gas to deposit said thin layer of silicon on said particles,
said deposition gas consisting essentially of silane and an inert carrier gas admixed therewith, and containing from about one to about five mole percent silane;
(B) and at a reaction temperature between the thermal decomposition temperature of silane and the melting point of silicon.

In an important aspect this invention provides as another preferred embodiment:

A process of producing elemental silicon in a high state of purity and with a reduced amount of silicon dust on the surface thereof, said process comprising the step of intimately contacting
(A) a bed of particles of high purity silicon maintained,
  (i) in a vertically disposed reaction zone, and
  (ii) at a reaction temperature higher than the thermal decomposition temperature of silane with
(B) silane contained in a first and second decomposition gas,
  each of said deposition gases being introduced into said bed of particles at a flow rate sufficient to maintain said bed in a fluidized state within said reaction zone,
said first deposition gas being introduced for a first deposition period and being a mixture of about 10 to about 15 mole percent silane in hydrogen, said second deposition gas being introduced for a second deposition period beginning substantially immediately after the termination of said first deposition period, and being a mixture of about 1 to 5 mole percent silane in hydrogen,
said process being further characterized in that said first deposition period is from about 2 to about 5 times as long in time duration as said second deposition period.

In another preferred embodiment, this invention comprises (I) conducting the process described immediately above and (II) subsequently recovering the larger-sized silicon particles that are formed in said reaction zone.

Furthermore, this invention also provides improved polysilicon products suitable for example, to prepare silicon for semiconductor devices.

In important aspects, this invention comprises operation of a fluidized bed reactor. Reference to FIG. 1 will illustrate such an embodiment of this invention.

In that figure, a fluidized bed reactor is illustrated by reactor 1 having a reaction zone containing particles of high purity silicon. The reactor is fitted with external heating means 2 surrounding the reactor zone, and sufficient to heat the bed of particles to an operation temperature above the decomposition temperature of silane. The reactor is fitted with feedline 3 for introduction of seed silicon particles, and line 4 for removal of larger-sized silicon particles formed by the process of the invention. The reactor has a gas distributor 5 which is a multiple pore device through which silane and hydrogen, or other carrier gas, is introduced into the bed of particles in the reactor. The pores of the distributor device are numerous, to facilitate intimate contact of the deposition gases with the particles in the reaction zone. Line 6 provides for exit of gases, (such as carrier gas, unreacted silane, and by-product hydrogen) admixed with silicon fines or dust particles formed during the process. The fines are removed by collection device 7. Hydrogen from the collection device can be recycled through line 8, pump 9 and a heat exchanger, not shown, back into the reactor as carrier gas. The process is a net producer of hydrogen and therefore a portion of hydrogen from device 7 can be sent via line 10 to other uses, not part of this invention.

The hydrogen and silane are admixed and adjusted to desired concentrations by passage through metering and monitoring devices (not shown). After admixture, the resultant gas mixture enters the reactor device below distributor 5 via line 11. The incoming gas may be preheated if desired. To prevent fouling and plugging, distributor 5 may be fitted with cooling means, (not shown).

Preferably, the reactor is first operated under high productivity conditions, for example by using a deposition gas containing 10 to 100 mole percent silane and a process temperature of preferably 620° C.–750° C. When operated in this manner a significant amount of silicon metal dust or fines is formed as a co-product. Some of this is removed by line 6 and collected in collection device 7, as described above. Other dust particles are deposited on the surface of the larger silicon particles in tee fluidized bed, and can cause problems on handling after the larger particles are removed from the device.

To conduct the process of this invention, the operator charges the reactor with the desired amount of silicon bed particles. The reactor volume filled with particles is measured. After using a first deposition gas, the mass of silicon that has been deposited within the particle bed is determined. For example, the operator may charge the reactor with 300 kg of bed particles having an average particle size or surface mean diameter ($d_{ps}$) of 625 microns. After bringing the bed to an operating temperature of say 640° C., a first deposition gas, for example comprising 65 standard cubic feet per minute of hydrogen and 50 pounds per hour of silane, is introduced into the reactor and this gas mixture is continuously fed for three hours. From reactor effluent gas analysis for unreacted silane, and from the amount of dust collected in the effluent gas during the feeding period, the operator can determine what percentage of silane fed has deposited silicon on the bed particles. For example, assume the operation results in 90% of the silicon that was fed as silane being deposited on the bed particles. Then:

$$\text{Si deposited} = 50 \text{ lbs/hr.} \times \frac{28(\text{at. wt. of Si})}{32(\text{mol. wt. of SiH}_4)} \times 90\% = 39.4 \text{ lbs/hr}$$

This is equal to (39.4÷2.2) or 17.9 kg/hr. of silicon deposited. Therefore, the increase of bed weight over 3 hours is (17.9×3) or 53.7 kg. The increase in bed weight can be expressed as (54.7/300) or 18%.

From a sample of the bed particles, the operator determines the particle size distribution using a screen analysis. From this determination the operator calculates surface area per gram or surface mean diameter, $d_{ps}$. For example, assume screen analysis shows that the $d_{ps}$ after the three hour deposition has increased from 625 to 650 microns. Then, the total bed particle surface area is given by the expression:

$$Ap = \frac{6W_p}{d_{ps}} \cdot \rho$$

where $\rho$ is the density of silicon, i.e. 2.32 gm/cm$^3$. Hence, Ap in this instance will be:

$$\frac{6 \times 354 \text{ kg} \times 1000 \text{ g/kg}}{650 \times 10^{-4} \text{ cm} \times 2.32 \text{ g/cm}^3}$$

$$\frac{2.124 \times 10^6}{1508 \times 10^{-4} \text{ cm}^{-2}}$$

$$\frac{2.124 \times 10^6}{0.1508 \text{ cm}^{-2}} = 14.08 \times 10^6 \text{ cm}^2$$

Assume further that the operator wishes to deposit a layer of silicon of average thickness of 1.5 micron to make the dust on the surface of the particles adhere to and become a part of the particles. Then, the amount of silicon to be deposited is given by the relationship:

$$\begin{aligned}
\text{Si required} &= \Delta \times Ap \times \rho \\
&= 1.5 \times 10^{-4} \text{ cm} \times 14.085 \times 10^6 \text{ cm}^2 \times \frac{2.32 \text{ kg}}{1000 \text{ cm}^3} \\
&= \frac{49.0 \times 10^2 \text{ kgcm}^3}{1000 \text{ cm}^3} \\
&= 4.9 \text{ Kg of silicon}
\end{aligned}$$

If the operator assumes a 95% deposition efficiency for the silicon fed as silane, then the total amount of silane to be fed in the second deposition gas will be $$\text{Silane required} \frac{4.9}{0.95} \times \frac{32}{28} = 5.9 \text{ Kg. Silane}$$

If the silane is to be provided in a concentration of 4 mole percent with hydrogen introduced at 65 SCFM, then the following calculations show the rate of introduction of silane.

$$\begin{aligned}
\text{wtH}_2/\text{hr.} &= 65 \text{ ft}^3/\text{min} \times 0.028 \text{ m}^3/\text{ft}^3 \times \\
&\quad 1000 /\text{m}^3 \times 0.09 \text{ g/l} \times 60 \text{ min.} \\
&= 9828 \text{ g or 9.8 kg of H}_2 \text{ per hour}
\end{aligned}$$

This amount of hydrogen is equal to 9828/2 or 4914 moles of hydrogen per hour. At a desired concentration of 4 mole percent in the second deposition gas, (0.04×4914)÷0.96 or 204 moles of silane must be fed per hour, i.e. or 6.55 kg of silane. Since only 5.9 kg of silane is required for depositing the 1.5 micron layer, the operator will feed the silane at the calculated rate for 0.9 hours, i.e. 54 minutes.

The total depositions are 53.7+4.9 or 58.6 kg of silicon. Hence the operator can withdraw 58.6 kg of product from the reactor, calculate the number of product particles and replenish the reactor with the same number of seed particles and repeat the cycle.

The amount of silane introduced into the reactor as a second deposition gas generally consists essentially of 1–5 mole percent silane in an inert carrier gas. Such a silane concentration favors chemical vapor deposition substantially free of homogeneous decomposition at the preferred process temperature, 620°–650° C.

If product particles are removed from the reactor after the second deposition, the amount of readily removable surface dust will have been reduced by a considerable extent. Stated another way, a significant amount of the surface dust deposited on the particle surfaces during the high productivity operation will have become glued on, bonded or united, i.e. made to adhere to the larger particles by the thin layer deposited from the second deposition gas. The dust or fines are typically composed of particles about 0.2-0.5 microns in size; the particles on which the silicon deposition take place preferably have a surface mean diameter of about 400-1000 microns, more preferably about 400 to about 700 microns. Generally, during the second deposition homogeneous decomposition of silane cannot be entirely avoided and consequently some additional dust is deposited upon silicon particles in the bed. However, since the second deposition is conducted under conditions which heavily favor heterogeneous deposition, the amount of additional dust deposited is relatively small. However, some dust may remain on the particles after the cementing operation and may be produced by that operation.

The use of two deposition gases in the invention as discussed above reflects two important aspects of this invention. First, it is desirable, from the standpoint of productivity, to operate a fluidized bed reactor for production of silicon from silane under conditions by which silicon is deposited rapidly, but which (unfortunately) also cause homogeneous decomposition of silane to occur to a significant extent, thereby resulting in formation of a significant amount of silicon fines or dust co-product. Although the fines or dust elutriated from the reactor are not nearly as valuable as the larger silicon particles produced, and in fact can amount to waste, operation in such a regime is attractive because growth of the silicon particles occurs at a rate faster than achievable under conditions where only chemical vapor deposition takes place. To upgrade the product particles, it is desirable to lower the amount of dust that is loosely deposited on the surface. Of course, the dust can be removed by polishing or by immersing the dusty particles in a liquid and agitating the resultant mass, say with ultrasonic vibration to assist removal of the dust. But an alternative method is needed since such treatments are costly, wasteful and can introduce a source of particle contamination. This invention satisfies that need.

The second important aspect of this invention comprises the discovery that the use of the second deposition gas as taught herein comprises a treatment that cements surface dust, resulting in a product that not only has the required purity, but which can be more readily handled. It was also unexpectedly discovered that this bonding or uniting of the surface particles requires less than one micron, for example 0.1-1.0 microns. Hence, for this invention 0.1 to 5.0 microns of additional silicon are deposited on the particle surface.

It is to be understood that the process of this invention is not critically dependent on the size or configuration of the fluidized bed reactor. For example, in contrast to the device shown in FIG. 1, the feed silicon seed particles can be added near the bottom of the reactor and product taken off near the top. Moreover, the reactor can be short or tall and the process conditions adjusted in order to make satisfactory product by operation thereby. In this regard it is preferred to operate in accordance with good fluid bed reactor processing as appreciated in the art; but it is not critically necessary to do so.

To achieve better results the gases and silicon particles in the bed are intimately contacted. Means for achieving this will be apparent to a skilled practitioner from the discussion below.

To promote contact between the deposition gases and also to reduce to a low level the amount of silicon fines production via homogeneous or gas phase silane decomposition, gas bubble size is kept small. Bubble size control is assisted by good gas distribution through the distibutor, even flow with avoidance of slugging, and lower gas velocity. In many instances gas velocity is above that required to keep fines production to a minimum; since such greater velocities can contribute to increased productivity of desired product, i.e. weight of silicon deposited per unit time.

Generally, there is a threshold or minimum gas velocity required to keep the particle bed in a fluidized state. Operational velocities for input of deposition gas into the bed are generally somewhat above this minimum, $U_{min}$. In many instances the operation velocity U, is 1 to 10 times $U_{min}$; preferred velocities are $1.2 \leq U/U_{min} \leq 8$; more preferably, $1.5 \leq U/U_{min} \leq 3.5$.

The first and second deposition gas may be introduced at the same or different rates, as desired. Generally, good results are obtained if the hydrogen or other inert gas is introduced at about the same rate, and differing rates are used for silane in order to adjust the concentration of silane. As indicated above, the first deposition gas is preferably used so that silane is introduced at a rate which together with the other variables favors high productivity, while the second gas is introduced with silane under conditions which heavily favor chemical vapor deposition and reduce the amount of homogeneous decomposition. The flow of hydrogen in each gas can be the same. In many instances the slower introduction of silane in the second step or mode results in a higher percent of silicon introduced (as silane) being deposited.

Although from a theoretical point of view it might be better to operate such that all silane contacted with the bed of silicon particles decomposes to form silicon while being contacted with the bed, this is generally not the preferred case in actual practice. It has been found advantageous to operate the first step, i.e. the high productivity mode under conditions wherein about 10-25% of the silane does not react and exits the reactor. Operation in a regime that comprises this feature enhances productivity; growth or deposition rates are higher at higher conversions, however dust production is high when conversions are high. For the second mode dust formation is much reduced.

Intimate contacting of the gaseous reactant and deposition surface is facilitated by introducing gas into the bed through a distributor having a plurality of openings in its surface adjacent to the bed of particles. Preferably the openings are substantially uniform, relatively small, and substantially evenly spaced across the surface that is adjacent to the bed surface.

For this invention, the introduction of gases into the fluidized bed is conducted by introducing the gases at a slightly positive pressure to facilitate fluid flow. The pressure of the gas introduced at or near the interface of the distributor and the bed is generally 1 to 3 atmospheres, more preferably from about 1.01 to 2 atmospheres.

It is readily apparent to a skilled practitioner that the size of the particles, bed height, bubble size, gas velocity and pressure, size and configuration of the reaction zone, are important variables but not a part of the essence of the invention disclosed herein. Selection of a matrix of operating conditions by a skilled practitioner and within the guidelines discussed herein, will achieve good results.

As immediately recognizable by a skilled practitioner, it is necessary that the process be conducted above the decomposition temperature of silane; i.e. above about 500° C. Thus, suitable means must be provided so that the deposition gas being contacted with the silicon particles is above the temperature at which silane thermal decomposition begins to take place. The process temperature is further selected so that the relative rates of (a) deposition of silicon on the particle surfaces compared to the (b) rate of fines formation via homogeneous gas phase decomposition is within acceptable limits. Thus, it is preferred that the process temperature be within the range of from about 590° C. to about 650° C.; more preferably from about 620° to about 650° C. The temperature can be any temperature between the thermal decomposition temperature of silane and the melting point of silicon. The preferred temperatures given above are selected for use with silane and by such considerations as the level of impurities picked up from feed lines in the reactor employed, and the degree of homogeneous decomposition. Utilizing a different system or a different degree of homogeneous decomposition, the process can be operated very well with different preferred temperatures. For example, when using dichlorosilane as a source of silicon, temperatures employed can be within the range of from about 800° C. to about 900° C. When using trichlorosilane the temperature can be within the range of from about 1000° C. to about 1100° C. Generally speaking, the amount of dust formed with halogenated silanes is less than that formed when silane is used as the vaporous silicon-containing compound within the deposition gas. Usually the temperature for the first and second mode are about the same since it is inconvenient to change the temperature because of the high heat capacity of the apparatus; especially when it is comparatively large in size.

Table I gives surface dust measurements of typical fluid bed operation. The data were obtained from three different size reactors configured as shown in FIG. 1 and operated as describe above. Particle size, silane concentrations, and bed temperature were varied as indicated in the table. These data show a direct relationship between the reactor productivity and the amount of dust adhering to the particle surface. To produce polysilicon with an acceptable surface dust level (e.g., 0.1 wt. %) with a reactor operated using typical prior art fluid bed operating procedures, reactor productivity would be limited to 10–20 lb/hr ft$^2$. However, because of obvious economic considerations, it is desirable to operate at higher productivities and, much higher productivities are usable. Examples of higher productivities are given in the table.

As indicated above, the process of this invention comprises operating in two modes, one of which emphasizes productivity, the other emphasizes product quality. The mode that emphasizes productivity not only provides chemical vapor deposition of silicon on silicon particles but also produces silicon dust. Some of this dust remains loosely adhered to the product surfaces and is detrimental to product quality. The mode that emphasizes product quality comprises operation at a lower productivity thus lower dust production. The combined operation of this invention produces acceptable product at higher productivities than conventional procedures. Rather than removing the unwanted dust particles, this operation cements this dust to the product surface. Thus dust produced by the high productivity mode exemplified by Table I can be reduced in amount following the procedures of the gluing on mode described herein and illustrated by the examples.

TABLE I

| | | | PRODUCT SURFACE DUST FOR TYPICAL FLUID BED OPERATION | | | | |
|---|---|---|---|---|---|---|---|
| | | Average. | Silane Feed | | Average | Bed | |
| Reactor | Reactor I.D., Inch | Bed Temp., °C. | Productivity,[1] Lb/Hr Ft$^2$ | Molar % In H$_2$ | Particle Size (dps)[2], micron | Mass, kg | Surface Dust, Wt % |
| 1 | 4.5 | 650. | 11. | 7.5 | | | .08 |
| 2 | 6.25 | 650. | 33.8 | 12. | 777. | 52. | .22 |
| | 6.25 | 650. | 36.1 | 12. | 714. | 50. | .33 |
| | 6.25 | 650. | 44.6 | 14. | 748. | 31. | .34 |
| | 6.25 | 650. | 33.3 | 14. | 660. | 50. | .34 |
| | 6.25 | 650. | 33.3 | 14. | 690. | 50. | .36 |
| | 6.25 | 650 | 46.9 | 18.5 | 724. | 45. | .48 |
| 3 | 14.5 | 660. | 19.–25. | 5.7–7.5 | 845. | 370. | .092–.123 |
| | 14.5 | 645. | 44. | 15.4 | 545. | 370. | .31 |
| | 14.5 | 627. | 44. | 15.4 | 328. | 230. | .197 |
| | 14.5 | 624. | 44. | 12.1 | 851. | 220. | .358 |
| | 14.5 | 624. | 44. | 13.0 | 671. | 280. | .284 |
| | 14.5 | 632. | 65. | 19.1 | 627. | 230. | .221 |

[1]Productivity defined as the silane feed rate per reactor cross sectional area.
[2]Surface mean diameter, microns.

To facilitate maintaining the desired temperature in the reaction zone, the gases used for silicon deposition and/or to maintain the particle bed in ebullient motion can be preheated prior to introduction into the reactor. For example, the hydrogen can be preheated. Preheating can be to some temperature level below that which causes silicon deposition within the distributor. To help avoid this difficulty, the distributor can be fitted with cooling means. Moreover, the gas should not be heated so high as to cause an untoward amount of deposition near the distributor which welds or solders so many beads together that an untoward amount of pluggage occurs. It has been found that good results are obtained if the gas is preheated to a temperature of about 300°–400° C.

The process of this invention is conducted using a fluidized bed of silicon particles. These particles are of sufficient purity to be acceptable for the use intended. The seed particles used to prepare particles in the bed can be prepared by this invention followed by reducing particle size to an average of 200 microns with an 80–400 microns range. Seed particles can be irregular in shape. They tend to become substantially spherical during operation of the reactor. Preferably the bed particles after silicon deposition have a $d_{ps}$ of 400–1000 microns, more preferably from about 600 to about 800 microns. However, beds having a $d_{ps}$ of 300–2000 microns can be used. The average particle size and the size range is not critical, so long as the bed can be fluidized under acceptable operating conditions.

The process of this invention can be operated in the high productivity mode for as long as desired. In other words, for the high productivity operation, time is essentially an independent variable and is only governed by convenience, reactor capacity, amount of silane available or some similar operation variable or variables. As an example, when using an 18" reactor, at a productivity rate of 50 pounds of silicon per hour, a reaction temperature of 650° C., a deposition gas comprising 12–14% silane in hydrogen, a bed of particles weighing about 350 kg and having an average particle diameter of 450 microns (mu), it is convenient to cease high productivity operation when the bed weight has increased by about 40 kg to a total of about 390 kg.

After about that increase in weight, operation is shifted to the quality mode to unite dust particles deposited on the surface of the particles in the fluidized bed and thereby prepare the product of the invention. Typically, the quality mode for an 18" diameter reactor comprises contacting the bed of silicon particles with deposition gas of 1–5, preferably 2–4 mole percent silane in hydrogen, for the time required to deposit an additiona layer of about 0.1 to about 5 microns in thickness. This causes a significant part of the dust on the particles to glue on to the particles and form the improved product.

After the second layer is deposited, product is discharge from the reactor. Generally one removes about the weight of (a) new seed particles introduced plus (b) the weight of silicon deposited during the productivity and gluing on cycle.

To achieve preferred results, the use of the second deposition gas is conducted for a relatively short time but sufficient to cause a diminishment of the amount of readily removable dust on the surface of the silicon particles. Generally it is preferred to keep the duration of the quality-mode relatively short, so that operation can relatively quickly return to the high productivity mode and thereby allow the process to be conducted at a high overall productivity rate.

The general desirability to keep usage of the second deposition gas to a short duration has two ramifications. First, it is generally preferred to select as thin a second coat as will effectively do the job. As shown in one example given below, after about the first micron in thickness, additional deposition did not have an appreciable effect in reducing dust. Second, since the amount of silane to be utilized in the second deposition is a quantity that can be fairly closely estimated by calculation, and since the concentration of silane in the second deposition gas must be comparatively low so as to operate in a region where chemical vapor deposition is highly favored, the time duration when the second gas is employed is a dependent rather than an independent variable.

Generally, good results are obtained when the elapsed total time, which is the sum of the time durations of the first and second deposition periods, is within the range of about 2.5 to about 5 hours. Also, good results are obtained when the first deposition is from about 2 to about 5 times as long in duration as the second deposition. It is preferred to use a process sequence where the first deposition period is from about 2½ to about 3½ hours in duration and the second is from about ½ to about 1¼ hours in operation.

Preferably, the second deposition gas flow is begun before 10 minutes or so has elapsed from the termination of treatment with the first gas, i.e. the second gas is contacted with the silicon particles substantially immediately after the first gas has been contacted.

It is not necessary that the process be terminated after the second step is conducted. The sequence of the first and second deposition can be repeated after removal of product from the reactor and the addition of seed particles. For example, with product removal and replenishing of seed particles as indicated above, the process can be run one or two weeks or more by repetition of the deposition sequence 100 or more times.

Although good results are achieved by conducting the process on a semicontinuous basis using one reactor as described above, it is not necessary to do so. Alternatively the process can be conducted on a much more continuous basis. In this regard reference is made to the above discussion and FIG. 2.

Figure 2:
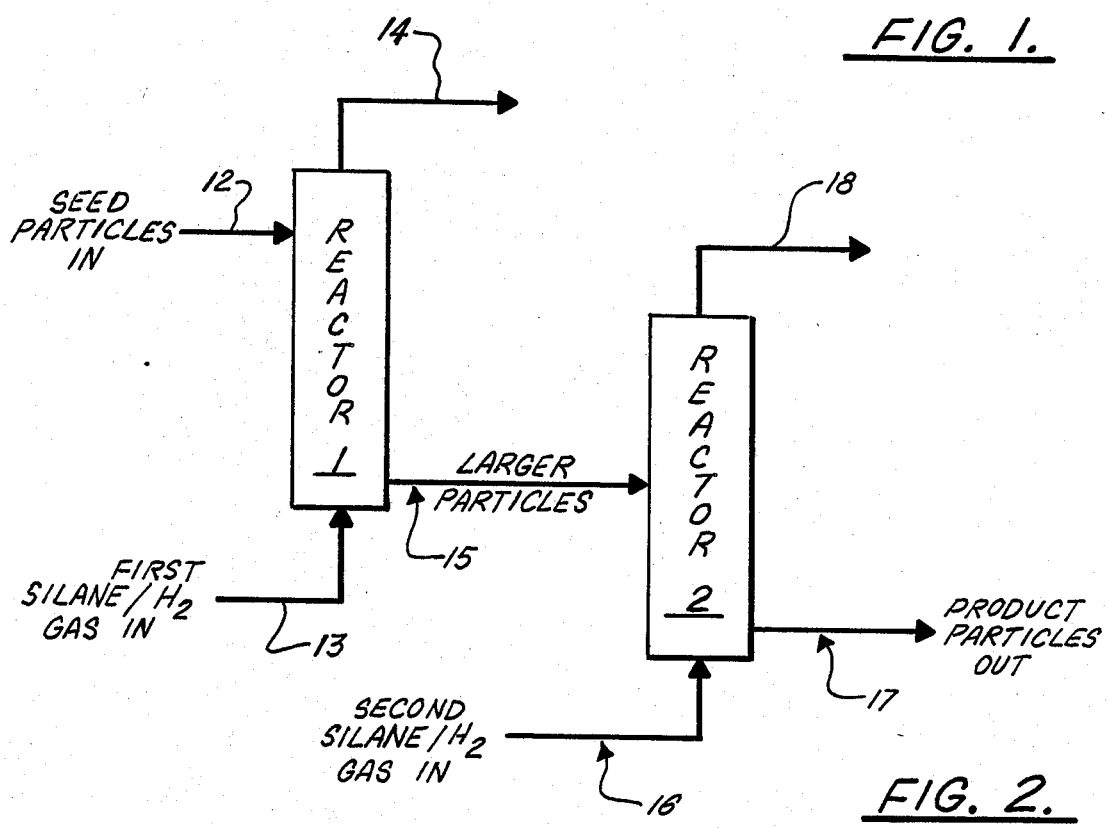
FIG. 2 is a schematic flow diagram, not to scale, depicting a more continuous operation of this invention. In contrast to the method and apparatus of FIG. 1, which comprise usage of one fluidized bed reactor, the embodiments depicted by FIG. 2 employ two such reactors; the product of the first reactor being fed to the other reactor so that the first reactor can be operated in a continuous or nearly continuous manner.

In FIG. 2, reactor 1 is a fluidized bed reactor substantially as described above and as depicted in FIG. 1. The reactor is charged with a bed of silicon seed particles from line 12 near the top of the reactor, as shown. Under the selected reaction conditions within the teachings above, the bed is fluidized and the particles therein contacted with the first deposition gas. It is preferred as discussed above that this first gas be a mixture of $SiH_4$ and $H_2$ (designated by "FIRST SILANE/$H_2$ GAS" in the drawing). This gas is introduced into the reactor via line 13. In the reactor, deposition of silicon and decomposition of silane occurs as above described, resulting in growth of the silicon particles, deposition of silicon fines on the surface of said particles, and elutriation of additional fines with carrier gas and by product hydrogen through exit line 14 at the top of the reactor. After the particle growth, a portion of the bed of particles is taken off by line 15 near the bottom of the reactor. This is replaced in the first reactor with additional seed particles and the first deposition in that reactor continued.

Line 15 is connected to fluidized bed reactor 2 such that particles with surface silicon dust are transferred from reactor 1 to reactor 2. In reactor 2 the second deposition gas, i.e. designated "SECOND SILANE/$H_2$ GAS" in the drawing is introduced through line 16. After cementing dust on the particle surfaces, product particles are removed through line 17. Gas and any elutriated fines exit the reactor through line 18. Hydrogen produced in either or both reactors can be recycled to either or both reactors after admixture with silane, or sent on for other usage.

In this embodiment the second reactor can be smaller than the first because only a minor portion of the total silane is contacted with the particles in the second reactor. It can also be operated at a different temperature. The above discussion concerning operation of a single FB reactor applies to conducting the process in two reactors.

EXAMPLE 1

A 400 kg bed of silicon particles was charged to the 14.5 inch diameter reactor and operated for 80–90 hours in a semicontinuous mode whereby seed particles were added every 1-2 hours and product was removed every 1-2 hours. By this procedure, bed level was maintained essentially constant during this period. The bed was subjected to deposition conditions as follows:

| | |
|---|---|
| Average bed temperature: | 645° C. |
| Silane feed rate: | 25 lb/hr. |
| Hydrogen feed rate: | 23-33 scfm |
| Silane feed concentration: | 11.5-15% molar |
| $U/U_{min}$: | 2.2-3.2 |
| Silicon Deposition: | 19 lb/hr. |

At the end of the period a sample was taken for screen and surface dust analyses. The surface mean particle diameter, $d_{ps}$, was determined to be 460 micron and particle surface dust was 0.198 wt. percent.

To analyze for surface dust, a 10 gram sample of silicon particles was placed in 10 ml of methanol in a screw capped bottle (approx. 4 oz. capacity) and placed in a water bath of an ultrasonic shaker device and subjected to ultrasonic vibrations (nominally 55,000 vibrations per second) for 30 minutes. The methanol with silicon dust particles suspended therein was passed through a sieve of 125 mu mesh. The procedure was repeated until the methanol remained clear after sonification. The methanol/silicon dust portions were combined and evaporated to dryness. The weight of the dried dust removed was determined. As indicated above, after the first deposition the weight of the dust was 0.198 wt. percent of the sample.

To glue surface dust on to the larger particles the bed was subjected to second deposition conditions as follows:

| | |
|---|---|
| Average bed temperature: | 645° C. |
| Period: | 0.5 hours |
| Silane feed rate: | 4 lb/hr. |
| Hydrogen feed rate: | 31 scfm |
| Silane concentration: | 2.5% molar |
| Silicon deposition rate: | 2.8 lb/hr. |

A sample of the particles was analyzed as above and the result was 0.12 wt. % surface dust. The silicon deposited was sufficient to add a layer of about 0.1 micron thick to the bed particles.

The procedure of this example can be repeated with the first deposition period using a silane feed stock containing 20%, 40%, 60%, 80%, or 90% silane admixed with hydrogen. Pure silane can also be employed. The temperature employed can be from 590° C. to 750° C. The gases used to glue on the surface dust can contain 1-5 mole percent silane in hydrogen. The deposition gases in both stages of operation, i.e. the first or high productivity stage, and the second mode, i.e. the gluing on process, can be preheated to 300°-400° C. prior to introduction into the bed of particles. The particle bed can be maintained in a fluidized state by introducing the gases at a rate defined by $U/U_{min}$ of from 1.5 to 3.5. The deposition in the second mode can be conducted to deposit a layer of silicon of 0.1 to 5 microns in thickness. In those instances where the gases contain hydrogen admixed with silane, the hydrogen utilized can comprise hydrogen recovered from the reactor and recycled to the input gases.

In the process of the above example, the first deposition can be conducted by adding seed particles every 1.0 to 3.5 hours. The second deposition or gluing on step can be conducted over a period of ½ to 1¼ hours in duration.

In the process of the above example, the deposition gases comprising silane and hydrogen, or substantially pure silane, can be introduced at a pressure of slightly above atmospheric pressure, i.e. about 1.01 atmospheres to about 3 atmospheres.

In the process of the above example the gluing on step is preferably conducted at 620°-650° C. using a gas containing 1 to 5, more preferably 2-4 mole percent silane in hydrogen.

The process of the above example can be repeated using silicon particles having a $d_{ps}$ of 400-1000 microns and with dust particles of from sub-micron size, e.g. 0.2-0.5 microns up to about 10 microns. The process of the above example can be repeated using seed particles of 200 microns $d_{ps}$ with a $d_{ps}$ range of 80-400 microns.

EXAMPLE 2

Following the operation of Example 1, product was drawn from the reactor so that 370 kg. of particles remained in the bed. The deposition of silicon was resumed and conducted for 24 hours using the following conditions:

| | |
|---|---|
| Average bed temperature: | 645° C. |
| Silane feed rate: | 50 lb/hr. |
| Hydrogen feed rate: | 55 scfm |

A sample of the bed was removed to determine particle size distribution and surface dust:

| | |
|---|---|
| $d_{ps}$: | 545 microns |
| Surface dust: | 0.31 wt. % |

The operation was resumed using a silane feed rate of 11.6 lb/hr., and a silane concentration of 4% in hydrogen with a silicon deposition rate of 8.1 lb/hr. The effect of surface dust was determined over time intervals of 1, 2, and 3 hours of treatment with the second deposition gas. The results were as follows:

| Hours of Treatment with Second Deposition Gas | Surface Dust Wt. % | Cementation Layer Added, Microns |
|---|---|---|
| 0 | 0.31 | — |
| 1 | 0.072 | 0.91 |
| 2 | 0.063 | 1.81 |
| 3 | 0.073 | 2.72 |

The dimensions of the cementation layers were calculated from the 8.1 lb. per hour silicon deposition rate, the 370 kg. bed and the 545 micron dps. The discrepancy in surface dust weight percent for the two hour run is believed to be due to experimental error.

EXAMPLE 3

Table II below summarizes results and conditions of several typical long duration fluid bed operations during which the semicontinuous method of this invention was demonstrated.

Typically, a bed of silicon particles of desired particle size distribution taken from previous operation is charged to the 14.5 inch diameter reactor. After desired bed temperature is reached, first deposition gas is fed for three hours. For each of the runs given in Table II, first deposition gas consisted of 50 lb/hr. silane mixed with 70 scfm of hydrogen (12.3% silane). During this period, bed increases from about 270 to about 315 kg. of silicon.

At the end of the first deposition period, adjustments to silane and hydrogen feed rates are made to give the desired secono deposition gas composition. Silane feed rate is reduced to 14.1 lb/hr. and hydrogen rate increased to 78.3 scfm (3.4% silane). The second deposition gas feed is continued for 1 hour which deposits about 4.5 to 5 kg. of silicon essentially uniformly over the entire bed particle surface. This operation is intended to deposit from 1.5 to 2.0 microns of surface layer depending on the exact particle size distribution.

During the last 10 minutes of the second deposition period, product is withdrawn from the reactor to bring bed back to the level at the start of the cycle. The amount withdrawn each cycle is estimated by the operator to be the sum of the weight of seed particles added plus the calculated amounts of first and second silicon depositions. Once product is withdrawn, silane and hydrogen flows are reset to the first deposition conditions.

Seed particles are added to the reactor at the start of each cycle to maximize growth on seed particles. Over the duration of the run, product particle size is controlled by the operator by the number of seed particles added each cycle. No attempt is made to change temperature from first to second deposition period because of the slow response time of this high heat capacity system. However, as feed gases are changed, bed temperature does increase slowly about 5° C. during the second deposition period and return slowly during the first. Table II gives the average temperature over the entire cycle.

Table II shows that surface dust was reduced to the range 0.03-0.08 wt. percent practicing this invention. For the same productivity and temperature range, dust would otherwise be between 0.3 and 0.35 wt. percent, Table I. Second deposition layer thickness ranged from 1.6 to 1.9 microns during the six runs for bed weights in the 247 to 271 kg. range and surface mean particle sizes of 662 to 744 microns. These runs comprise a total operating time of 876 hours and 61 samples taken for surface dust analyses.

The process of the above example can be modified and repeated so that the cycle used is a first deposition period of 2.5-3.5 hours and the second deposition period "gluing on" is 0.67-1.25 hours.

silicon particles, a bed temperature of 645° C., a silane feed rate of 25 lbs./hour, a seed addition rate of 1 lb./hour, a hydrogen feed rate of 27.5 cfm, a silane feed concentration of 15% molar, and a $U/U_{min}$ of 2.2-3.2 and a silicon deposition rate of 19 lb./hr.

Each hour, a 20 lb. (19+1) charge of particles can be transferred from the first to the second reactor and surface dust glued on using a deposition temperature of 645° C. The bed size is selected so that the residence time is sufficient to yield the desired thickness of cementation layer. The feed rate of hydrogen selected is sufficient to fluidize the bed, the silane concentration is 1-5% to produce low dust operation.

The process of this invention produces a highly desirable polysilicon product useful for the production of silicon semiconductor devices. The product in the form of approximately spherical particles. These are free flowing, and therefore can be handled much more readily by mechanized systems than the rods formed by the Siemen's process. Mechanical systems can be designed for storage, and handling of the free flowing material produced by this invention which decrease the chances for contamination. In general the size distribution of products produced by this invention have the following size distribution (microns):

| Typical range | 150-1500 |
|---|---|
| Typical average | 650-750 |

The particle density (g/cc) is:

| Typical range | 2.25-2.33 |
|---|---|
| Typical average | 2.30-2.31 |

Preferred materials have a bulk density of about 1360 kg/m$^3$. Surface dust is typically 0.010-0.070 weight percent. Using silane of good purity the concentration of key transition metal impurities approaches or matches high quality available Siemen's product. Typical purities from operation are:

|  |  | Average | Range |
|---|---|---|---|
| Boron | ppba | 0.12 | 0.01-0.25 |
| Phosphorus | ppba | 0.11 | 0.01-0.19 |
| Carbon | ppm | 0.25 | 0.16-0.33 |

TABLE II

| Run No. | Hours of Operation | No. of Cycles[2] | Bed Weight, kg | Avg. Bed Temp., °C. | Product Size (dps)[1], microns | Surface Dust, Wt % | | | | Layer Thickness Microns |
|---|---|---|---|---|---|---|---|---|---|---|
| | | | | | | No. Samples | Range | Mean | Std. Dev. | |
| 1 | 172 | 43 | 270 | 650 | 662 | 13 | .031-.127 | .079 | .027 | 1.6 |
| 2 | 168 | 42 | 271 | 668 | 708 | 10 | .012-.072 | .052 | .017 | 1.7 |
| 3 | 68 | 17 | 247 | 656 | 698 | 3 | .046-.06 | .052 | .007 | 1.9 |
| 4 | 151 | 38 | 260 | 628 | 727 | 10 | .022-.066 | .042 | .0151 | 1.8 |
| 5 | 147 | 37 | 262 | 632 | 671 | 11 | .015-.044 | .030 | .0083 | 1.7 |
| 6 | 170 | 43 | 265 | 640 | 744 | 14 | .016-.061 | .039 | .0151 | 1.9 |
| | 876 | | | | | 61 | | .049 | | |

[1]dps is the surface mean diameter.
[2]The cycle was fixed at:
1. 3 hrs at 50 lb/hr silane feed, 69.5 SCFM H$_2$, then
2. 1 hr "gluing on" at 14.1 lb/hr silane, 78.3 SCFM H$_2$ - product removed last 10 minutes.

It will be apparent to a skilled practitioner that the procedure of the above examples can be modified to a more continuous basis using two FB reactors. For example, the first step or high productivity mode is conducted in the first reactor, say by using a 400 kg. bed of While the invention has been described in terms of various preferred embodiments, those skilled in the art will recognize that various changes, modifications or omissions, can be made without departing from the heart or spirit of the invention as described above and set forth in the claims which follow below.

We claim:

1. A process for preparing particulate polysilicon having a reduced amount of silicon dust on surfaces thereof, said process comprising:
   (I) a productivity mode which comprises contacting in a fluidized bed, silicon seed particles having a size range of about 80 to 400 microns, with a gas comprising from about 10 to 100 mole percent of a thermally decomposable silicon compound, at a temperature above the thermal decomposition temperature of said compound; whereby (i) silicon metal produced from said compound is deposited on said seed particles thereby forming intermediate silicon particles having a size range of about 600 to 800 microns; and (ii) silicon dust, produced by homogeneous decomposition of said silicon compound, is deposited on surfaces of said intermediate particles;
   (II) a quality mode which comprises contacting in a fluidized bed, said intermediate particles having surface dust thereon, with a gas comprising from about 1 to about 5 mole percent of a thermally decomposable silicon compound, at a temperature above the thermal decomposition temperature of said compound; whereby a silicon layer having a thickness sufficient to cement surface silicon dust to said particles is deposited on said particles thereby reducing the amount of removable silicon dust from the surface of said particles.

2. The process of claim 1 wherein the same thermally decomposable silicon compound is employed in said productivity mode and said quality mode.

3. The process of claim 2 wherein said silicon compound is silane.

4. The process of claim 3 being conducted at a temperature within the range of 620° to 650° C.

5. The process of claim 3 wherein said quality mode is conducted using silane admixed with hydrogen as an inert gas.

6. The process of claim 1 wherein step (I) is conducted in one fluidized bed reactor and step (II) in another.

7. The process of claim 1 wherein steps (I) and (II) are conducted in the same fluidized bed reactor.

8. A process of claim 1, comprising conducting said step (I) using seed particles (a) porepared by the process of steps (I) and (II), followed by (b) reducing the particle size of the product of step (II) to an average of 200 microns with an 80 to 400 micron range.

9. A process for reducing the mount of silicon dust on the surface of particulate silicon particles, said particles (i) having a size range of from about 400 to about 1000 microns and (ii) having a surface dust content greater than about 0.1 weight percent, said process comprising contacting said particles in a fluidized bed with a deposition gas comprising 1 to 5 mole percent silane at a temperature between the thermal decomposition temperature of silane and the melting point of silicon, to deposit on said particle surfaces a layer of metallic silicon of from about 0.1 to about 5 microns, and thereby cement surface siliocn dust to said particles.

10. In a process for produoing particulate silicon by thermal decomposition of a vaporous silicon-containing compound in a fluidized bed, the improvement which comprises reducing the amount of silicon dust in the product by fluidizing (a) a particulate silicon having a size range of from about 400 to 1000 microns with (b) a gaseous stream comprising from about 1 to about 5 mole percent silane in hydrogen, at from about 620° to about 650° C.; such that a layer of metallic silicon is formed on the particulate product sufficient to make silicon dust adhere thereto, thereby reducing the surface dust content of said high purity particulate silicon to below about 0.1 weight percent.

11. A process of claim 10 wherein said stream of vaporous silicon-containing compound is introduced into said bed at a velocity defined by a $U/U_{min}$ ratio of from about 1.5 to about 3.5.

12. A process of claim 11 wherein said stream consists essentially of from about 2 to about 4 mole percent silane in hydrogen.

13. A process of claim 12 wherien at least a poriton of said hydrogen is recycled hydrogen previously (a) produced by thermal decomposition of silane in deposition gas intimately contacted with said particle bed (b) subsequently collected after exit form said bed and (c) thereafter incorporated in said deposition gas by admixing with the silane prior to reintroduction onto said bed of silicon particles.

14. A process of producing elemental silicon, said process comprising the steps of intimately contacting
   (A) a bed of particles of silicon maintained, (i) in a vertically disposed reaction zone, and (ii) at a reaction temperature higher than the thermal decomposition temperature of silane with
   (B) silane contained in a first and second deposition gas, each of said deposition gases being introduced into said bed of particles at a flow rate sufficient to maintain said bed in a fluidized state within said reaction zone,
said first deposition gas being introduced for a first deposition period and being from about 10 to about 100 mole percent silane in hydrogen, said second deposition gas being introduced for a second deposition period beginning substantially immediately after the termination of said first deposition period, and being a mixture of about 1 to about 5 mole percent silane in hydrogen,
   said process being further characterized in that (i) said first deposition period is from about 2 to about 5 times as long in time duration as said second deposition period, and (ii) in said second deposition period, a silicon layer having a thickness of about 0.1 to about 5 microns is deposited on particles of about 400 to 1000 microns and silicon dust is adhered thereto, such that the dust content of said product is reduced to less than about 0.1 weight percent.

15. The process of claim 14 wherein said reaction temperature is form about 590° C. to about 750° C.

16. The process of claim 15 wherein said reaction temperatue is from about 620° C. to about 650° C.

17. The process of claim 16 wherein the deposition gases are introduced at a rate defined by $U/U_{min}$ of from about 1.5 to about 3.5.

18. The process of claim 16 wherein each of said deposition gases is preheated to a temperature of from about 330° C. to about 350° C. prior to their introduction into said bed of particles.

19. The process of claim 16 wherein at least a portion of the hydrogen in one or both of said deposition gases is recycled hydrogen that had been produced by the thermal decomposition of silane in said reaction zone, then collected after exit from said zone, and then incorporated in said deposition gas by admixing with silane prior to reintroduction therewith into said bed of seed particles.

20. The process of claim 16 wherein the pressure within said reaction zone is 1 to 3 atmospheres.

* * * * *

UNITED STATES PATENT AND TRADEMARK OFFICE
CERTIFICATE OF CORRECTION

PATENT NO. : 4,784,840

DATED : November 15, 1988

INVENTOR(S) : Marcelian F. Gautreaux et al.

It is certified that error appears in the above-identified patent and that said Letters Patent is hereby corrected as shown below:

Abstract, 5 lines from bottom reads "tht" and should read -- that --.

Column 5, line 27 reads "tee" and should read -- the --.

Column 9, line 67 reads "describe" and should read -- described --.

Column 11, line 38 reads "charge" and should read -- charged --.

Column 17, line 47 reads "porepared" and should read -- prepared --.

Column 17, line 61 reads "siliocn" and should read -- silicon --.

Column 17, line 62 reads "produoing" and should read -- producing --.

UNITED STATES PATENT AND TRADEMARK OFFICE
CERTIFICATE OF CORRECTION

PATENT NO. : 4,784,840

DATED : November 15, 1988

INVENTOR(S) : Marcelian F. Gautreaux et al.

It is certified that error appears in the above-identified patent and that said Letters Patent is hereby corrected as shown below:

Column 18, line 13 reads "wherien at least a poriton" and should read -- wherein at least a portion --.

Column 18, line 19 reads "onto" and should read -- into --.

Column 18, line 49 reads "form" and should read -- from --.

Signed and Sealed this

Tenth Day of October, 1989

Attest:

DONALD J. QUIGG

Attesting Officer

Commissioner of Patents and Trademarks